(12) United States Patent
Wetzel et al.

(10) Patent No.: US 6,636,320 B1
(45) Date of Patent: Oct. 21, 2003

(54) FIBER OPTIC TUFTS FOR FLOW SEPARATION DETECTION

(75) Inventors: Todd G. Wetzel, Niskayuna, NY (US); Edward R. Furlong, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 323 days.

(21) Appl. No.: 09/691,747

(22) Filed: Oct. 18, 2000

(51) Int. Cl.[7] ................................................ G01B 9/02
(52) U.S. Cl. ................ 356/477; 385/13; 250/227.14; 244/203
(58) Field of Search .................. 250/227.14, 227.16, 250/227.24, 227.25; 73/861.19, 147; 385/13; 356/477, 480; 244/203

(56) References Cited

U.S. PATENT DOCUMENTS 4,936,146 A * 6/1990 Stack et al. ................. 73/432.1
5,827,976 A * 10/1998 Stouffer et al. ............. 73/861.19
6,380,535 B1 4/2002 Wetzel et al.

OTHER PUBLICATIONS

"Evaluation of a Wall–Flow Direction Probe for Measurements in Separated Flows," Journal of Fluid Engineering, 1981.

* cited by examiner

*Primary Examiner*—Richard A. Rosenberger
*Assistant Examiner*—Vincent P. Barth
(74) *Attorney, Agent, or Firm*—Erik R. Katz; Geoff L. Sutcliffe; Kilpatrick Stockton LLP (57) ABSTRACT

Flow separation detectors and, more particularly feedback sensor arrangements consisting of optical fiber tufts adapted to provide for the measurement of surface aerodynamic flow phenomena through the effects birefringence or transmitted light, and especially with regard to aerodynamic flow separation which is encountered over a surface. Also facilitated is the detection of aerodynamic flow separation with a concurrent detection of encountered mechanical strain and stresses on the surface structure being monitored.

42 Claims, 8 Drawing Sheets

Optical Transmission

Fiber optic tufts mounted on upper surface of wing. When laser light is emitted through fibers, camera sees light emissions from any fiber pointing downstream (in attached flow).

Camera mounted on aircraft tail, viewing upper surface of wing.

*Fig. 6*

Camera's view when air flow is attached.

*Fig. 7a*

Camera's view when some flow is seperated (seperation bubble near inboard in this case).

Fiber Optic Sensor Embedded in External Tape; Electro-Optics Embedded in Tape

Fig. 11

Structures Added to Fiber to Increase Drag

Fig. 12

Lens Added to End of Fiber

FIBER OPTIC TUFTS FOR FLOW SEPARATION DETECTION

BACKGROUND OF THE INVENTION

Field of the Invention

The present invention relates to flow separation detectors and, more particularly relates to feedback sensor arrangements adapted to provide for the measurement of surface aerodynamic flow phenomena, and especially with regard to aerodynamic flow separation which is encountered over a surface. Moreover, the invention is also directed to aspects which facilitate the detection of aerodynamic flow separation with a concurrent detection of encountered mechanical strain and stresses in the surface structure being monitored.

Currently, various types of detection or sensor systems are being investigated for their applicability to the technology concerning problems which are being encountered as a consequence of aerodynamic flow separation; for instance, such as during airflow over the wing surfaces of an aircraft, and which may have a important bearing on and potentially adversely influence the performance of the aircraft. For example, some of the systems being investigated provide for a so-called closed-loop control of aerodynamic flow separation, which necessitate the provision of feedback sensors which are sensitive to flow separation, and whereby such sensors are typically required to be surface-mounted on the surface or wall which is subject to aerodynamic flow separation. At this time essentially fully developed and commercially available sensors employed for this purpose are pressure transducers which are capable of measuring surface aerodynamic phenomena and flow separation parameters.

In particular, types of sensors which are adapted for the investigation or measurement of aerodynamic flow separation which takes place on a surface or wall may be so-called electronic "thermal tuft" sensors. Thus, in essence, thermal tuft sensors may be generally constituted of one or more electrical heating elements with temperature sensors being mounted spaced upstream and downstream thereof along the presumed directions of aerodynamic flows passing over a surface. Generally, the flow separation, encountered in at least a two-dimensional flow, is defined by a location wherein the flow proximate a wall over a surface tends to oppose a primary flow direction; pursuant to a phenomenon referred to as a backflow. Thus, the thermal tuft sensors are spacedly mounted in the presumed flow direction. The electrical heating elements are normally pulsed on and off, thereby heating a local packet of fluid providing the aerodynamic flow. Depending upon the local instantaneous direction of the flow, either the upstream or downstream located temperature sensor will detect a rise in temperature as the heated packet of fluid is convected there past. Generally, the pulses are counted as a measure of the percentage of the time during which the flow is either upstream or downstream in its direction. Alternatively, the time internal between the heater element actuation and sensor detection can be recorded as a measure of near-wall upstream or downstream velocity magnitude.

Such electronic "thermal tuft" sensors are extensively described, in an article by Shivaprasad and Simpson entitled "Evaluation of a Wall-Flow Direction Probe for Measurements in Separated Flows", published in the Journal of Fluid Engineering, 1981. In that instance, a pair of thermal sensors are spaced along a surface whereby a free stream of a fluidic or airflow may have a flow direction extending across the locations of the sensors. A plurality of heaters are interposed between the sensors, and further heaters are arranged offset aside the directional flow so as to be able to determine aerodynamic separation or, in essence, a breakdown of a boundary-layer flow of fluid passing across the surface which may pass either directly across the sensors or at an angle relative thereto. These sensors are electronically connected to the electrical or electronic circuitry of a device which; for example, may be a part of an aircraft electrical operating system.

Although the foregoing thermal tuft sensors are generally satisfactory in operation in detecting flow separation phenomena, they require the input of electrical energy from the electrical components of various devices, or in connection with aircraft from the electrical aircraft system network, thereby representing a source for electrical energy drain and consumption.

More recently, in order to obviate or ameliorate the electrical energy requirements in the provision of feedback sensor arrangements, particularly such which are employed for a closed-loop control of aerodynamic flow separation; for instance, that on the wing of an aircraft wherein there can be encountered a breakdown of a boundary-layer flow which may adversely affect the performance of the aircraft, there has been developed a system of flow separation sensors which are based on fiber optics and which may be employed for separation feedback control. In that connection, reference may be had to the copending Wetzel, et al. U.S. patent application Ser. No. 09/396,472, now U.S. Pat. No. 6,380,535, entitled "Optical Tuft for Flow Separation Detection"; commonly assigned to the assignee of the present application, the disclosure of which is incorporated herein by reference. In particular, the sensors which are based on fiber optics may employ an optical tuft arrangement based on the thermal/fluidic principles of the electrical thermal tuft, but with the employing of fiber optics signal and energy transmission instead of electronics. To that effect, the light transmitted through the fiber optics is adapted to be converted into heat enabling a packed of heated fluid to be convected in the direction of a predominant aerodynamic flow, and to impact or contact one of the temperature sensors which are based on fiber optics at a small following time interval, so as to provide the required information concerning aerodynamic flow separation.

Although various other types of sensors have been developed which are based on fiber optics, these are primarily employed for the measurement of strain, acceleration and temperature, and currently there is also known the development of new pressure transducers in the technology. However, none of these sensors in themselves are designed for flow separation detection, particularly for use in the closed-loop control of aerodynamic flow separation, or for investigations of breakdown phenomena in boundary layer flow situations.

SUMMARY OF THE INVENTION

Accordingly, in order to substantially improve upon the current state of the technology, the present invention utilizes the end of an optical fiber as a tuft in itself, and optically transduces the movement of the fiber into a useable signal for flow separation detection.

The invention contemplates for a multitude of tufts to be placed on the surface (e.g., the surface of awing), with the tufts made out of an appropriate optical fiber material. The length of the optical fiber exposed to the airstream should be short, on the order of 0.1 to 1 inches, and the optical fiber should be very fine so as to be flexible, with diameters on the order of 0.001 to 0.01 inches. One embodiment calls for the fibers to be flexible enough to bend 90° or more (thus longer, with a smaller diameter), in which case the large flow fluctuations of a separated flow will result in dramatic tuft motion. Another embodiment calls for the tuft to be relatively stiff (thus shorter, with a larger diameter), in which case the large flow fluctuations of a separation flow will result in large optical fiber stresses.

The length of fiber that is not exposed to the aerodynamic flow can be packaged numerous ways. One embodiment calls for the fibers to be embedded in the skin material of the surface (especially when the skin is made of a cured composite material). Alternatively, the fibers can run inside the structure of the device (e.g., along the internal structure of a wing), and exit the wing surface through holes. Also, the fibers could be embedded in a low-profile tape, which can be applied to the surface, and can thus be easily replaced if damaged in service.

The optical fibers from many tufts are thus run to a central processing location, and either interface to a multitude of processing stations, or interface with an optical multiplexer which is interfaced to one processing station. Therefore, this sensor requires no electronics local to the sensor, and is in essence purely optical.

The strain and curvature induced by the air motion results in birefringence in the optical fiber. In a fiber loop or a fiber with a reflective end, the birefringence can be detected as a change in either the phase or the intensity of the transmitted light. Even a partially reflective end would be sufficient to detect the excess fiber losses induced by the curvature effects. Using fiber-optics to measure strain induced in the fiber is commonly practiced, and is described in many references (e.g., *Optical Fiber Sensors*, ed. By J. Dakin and B. Culshaw, 1997). In low speed flow, or in flow streams with weak transverse separations, the cross-sectional area of the fiber could be increased in the direction of interest to increase the drag and thus the sensitivity of the fiber tuft Likewise, other techniques can be used to increase the fibers' strain sensitivity, including fiber grating and tooth blocks.

When a tuft is in attached flow, in effect no flow separation, its motion is relatively small and predominantly in the flow direction. Likewise, the signal generated will be relatively constant and should be close to the rest value (defined for purpose of argument to be "zero"). The tuft in a separated zone will oscillate wildly, and typically have some mean direction that is not in the predominant flow direction. Likewise, the signal generated by this tuft will oscillate wildly and have some mean offset different than zero. Either the offset mean or the degree of variation of the signal can be used as indications of the presence and integrity of flow separation.

Alternatively, the ends of the fiber can be made to be transmissive, and one could view the light emitted from the fiber ends from a camera external to the test surface. If, for example, the camera were placed above a wing that has attached flow, the fibers would point downstream and their emitted light would not be visible to the camera. When the flow on the wing separates, the ends of the tufts will sometimes point upwards towards the camera, resulting in an image that indicates regions of separation. This could be very effective in wind tunnel testing, but may also be adaptable to aircraft or to other devices with flow separation.

In addition to the foregoing, the present invention has also further potential applications with regard to the optical fiber sensor aspects.

Additionally, the invention expands on the potential application for the sensors. In the present disclosure there is described using the sensors primarily as feedback for active flow control devices. However, even on an aircraft with no active flow control, these sensors could be of tremendous value. High-maneuverability aircraft, especially fighter aircraft, attempt to compensate for the stability or instability of the aircraft at any instant in time electronically. The closer one can keep an aircraft neutrally stable without becoming unstable, the more maneuverable will be the aircraft. Classical control systems in such aircraft are based on signals that one can reliably measure: accelerations, velocities, etc. Then, one attempts to relate these signals to the instantaneous aerodynamic forces and moments acting on the aircraft, and make control decisions based on this assumed aerodynamic state. In actuality, the true aerodynamic state in very severe maneuvers is very hard to adapt so as to predict from these inertial measurements. However, if one could measure the true instantaneous flow separation location and extent, with a sensor system such as ours, it is conceivable that such information would allow vastly superior control schemes, and thus superior aircraft maneuverability.

In particular, although generally referred to in connection with feedback sensors for active flow control on the aircraft it is also possible to utilize flow sensing any fluidic device, including gas turbines and aircraft engines, as long as the optical fiber and other exposed components can be designed to withstand the necessary flow temperatures encountered during operation of those particular devices.

A particular aspect of the invention resides in the utilization of the fiber optic tufts for strain sensing of the particular structures on which the optic fibers are located. Although it has already been proposed in the technology to utilize optical sensors on the wings of aircraft to measure strain of the wing structure, pursuant to the invention it is possible to utilize a single or unitary fiber structure to measure both mechanical strain in the structure, such as an aircraft wing, and concurrently flow separation utilizing the inventive techniques. This, in essence, imparts a multiple applicability and faculty to the present invention, heretofore unknown in the prior art.

Accordingly, it is an object of the present invention to provide an arrangement for the investigation of aerodynamic flow separation.

A more specific object of the present invention is to provide a sensor arrangement for the investigation of aerodynamic flow separation utilizing flow separation tuft sensors which are based on fiber optics.

Yet another object of the present invention is to provide for novel feedback tuft sensors which are based on fiber optics, wherein these are employed for aerodynamic separation feedback control, particularly with regard to aerodynamic flow separation taking place on the wing surfaces of an aircraft, and which may also concurrently measure strain and/or stresses acting on the surfaces.

A still further and more specific object of the present invention rises in the provision of feedback sensor arrangements for either the open-loop or closed-loop control of aerodynamic flow separation, which are adapted to extend through or to be positioned within the skin structure of an aircraft wing or airfoil.

BRIEF DESCRIPTION OF THE DRAWINGS

Reference may now be had to the following detailed description of preferred embodiments of the invention, taken in conjunction with the accompanying drawings; in which.

DETAILED DESCRIPTION OF PREFERRED EMBODIMENTS

Figure 1:
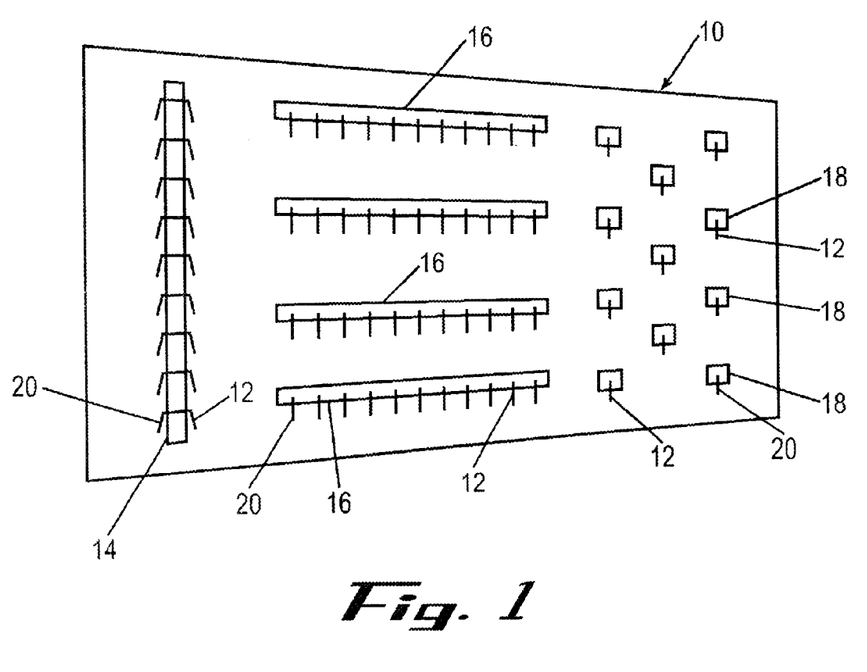
FIG. 1 illustrates, generally diagrammatically, a wing surface of an aircraft illustrating the attachment of optical fibers in the form of flexible tufts in various methods and at different locations.

Referring in particular to FIG. 1 of the drawings, there is illustrated, generally diagrammatically, a wing 10 of an aircraft. Illustrated are.a plurality of fiber optic filament elements 12 attached to the wing, for example through the intermediary of either tapes 14 applied to the wing extending cordwise, or a plurality of tapes 16 extending longitudinally of the wing; or alternatively, a plurality of small tape sections 18 each having a single fiber optic tuft or filament 12 attached thereto.

Essentially, each of the fiber optic elements 12 are single filaments or tufts of a relatively flexible or resilient nature, which are adapted to be displaced or fluctuated by aerodynamic flow conditions.

Alternatively, rather than being attached to the wing surfaces of means of tapes, the filaments 12 may extend either into or through the aircraft wing skin, as described in specific detail hereinbelow.

As shown, the various tapes and arrangements thereof are only representative, and numerous arrangements or arrays of fiber optic elements 12 may be readily positioned along the surface of the aircraft wing 10, or any other surface being tested as may be required for specific measuring conditions and data requirements.

The displacement of the respective optical fiber tuft 12 from its inert or idle position along the surface of the particular structure, in response to airflow tending to displace the free movable end 20 of the optical fiber tuft is representative as a measure of a various air flow and strain condition.

With regard to the measurement of the fiber optic tuft birefringence-intensive sensitivity, essentially two categories of aspects maybe considered.

Figure 2A:
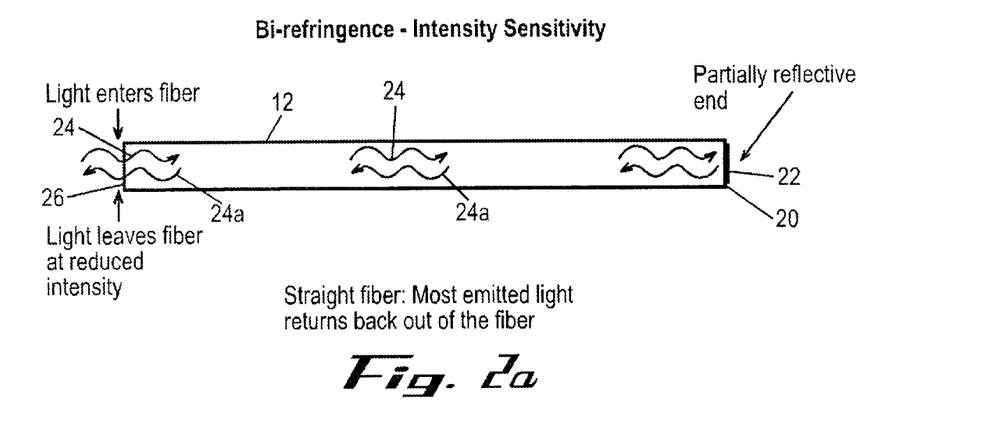
FIG. 2a illustrates birefringence and intensity sensitivity of a fiber optic forming a flexible tuft shown in its straight or flow attached condition.
Figure 2B:
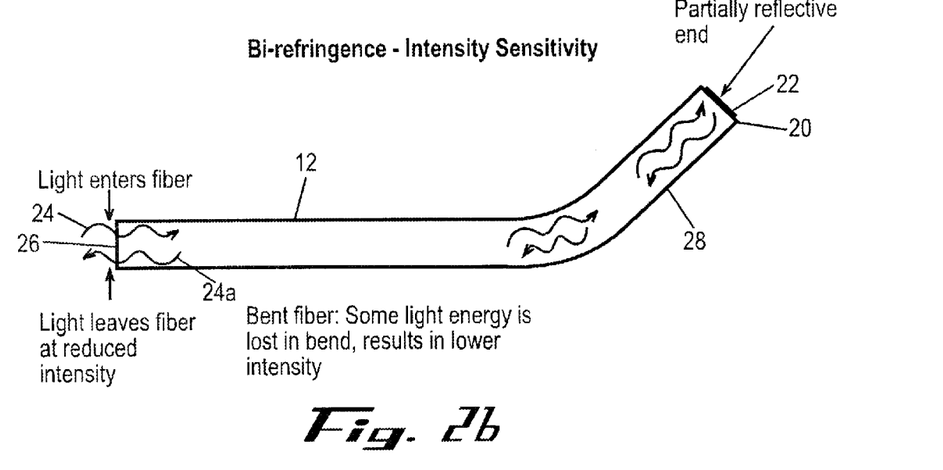
FIG. 2b illustrates the fiber optic tuft of FIG. 2a illustrated in a bent condition and responsive to aerodynamic flow separation detection.
Figure 3A:
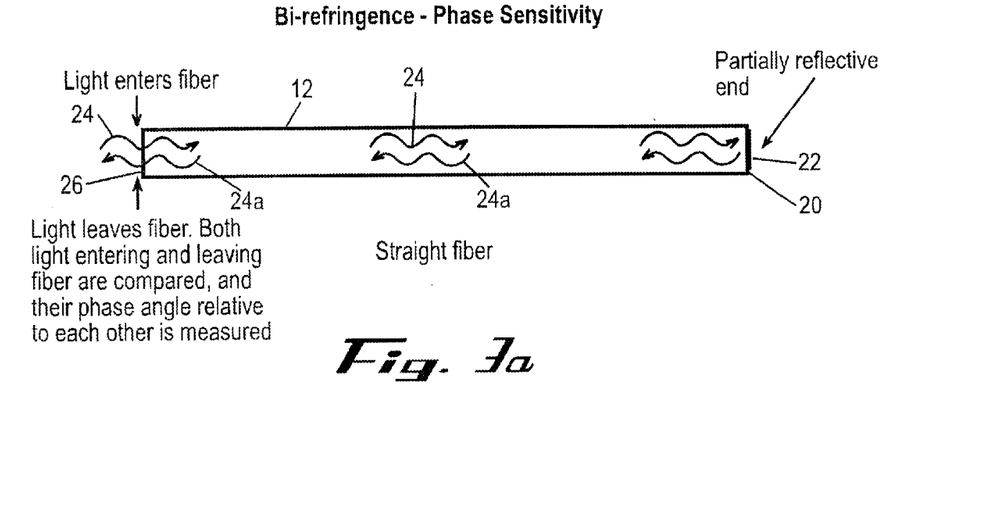
FIG. 3a illustrates birefringence of an optical fiber tuft for measuring phase sensitivity with the tuft consisting of a straight flow attached fiber.
Figure 3B:
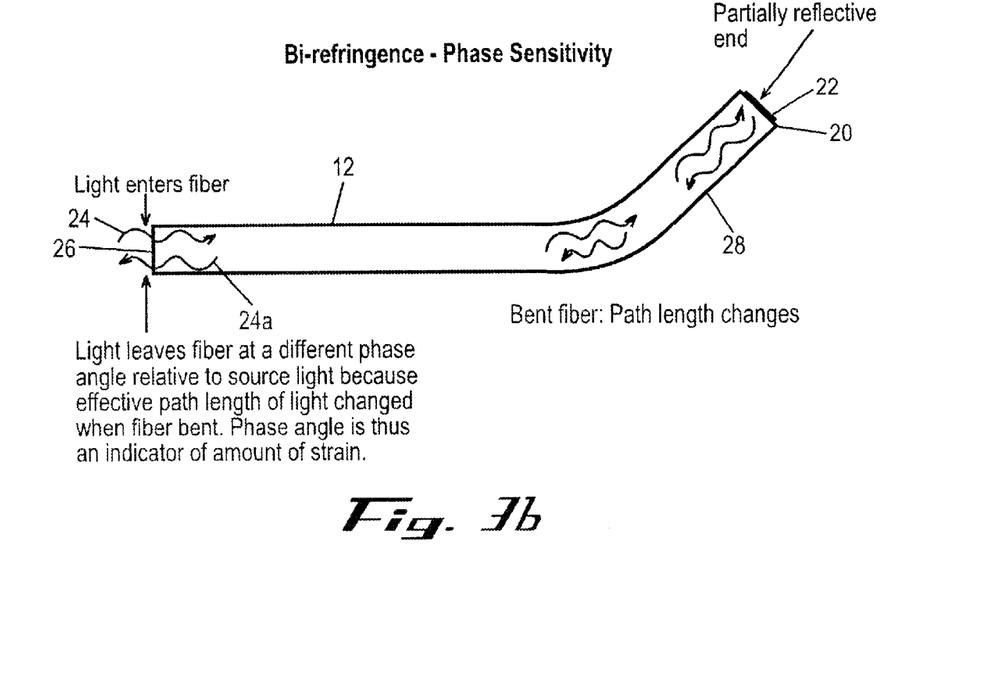
FIG. 3b illustrates the optical fiber of FIG. 3a illustrated in a bent condition showing changes in the path length of the light passing therethrough due to flow separation.

Thus, the flow separation induces movement in free end 20 of the optical fiber tuft 12, which induces strain in the fiber; whereas the birefringence effect transduces the strain into an optical signal; as represented in FIGS. 2a and 2b of the drawings; or phase sensitivity or variation is illustrated in FIGS. 3a and 3b of the drawings.

Another aspect resides in the light, such as laser light or other light in the visible spectrum being transmitted through the fiber tuft, wherein changes in local aerodynamic flow could result in movement of the fiber enabling a suitably positioned camera to monitor fiber ends, with the camera only receiving light from fibers attached flow which are pointing towards the camera. This is represented essentially in FIGS. 6, 7a and 7b of the drawings as described in further on in detail hereinbelow.

Reverting to FIGS. 2a and 2b, in FIG. 2a the fiber optic is a straight fiber tuft 12 lying entirely in contact against the surface, with the exterior free 20 end being partially reflective 22, and with light 24 emanating from a suitable source (not shown) entering and leaving the fiber at a first input end 26. The light 24a leaves the fiber 12 at that input end 26 at a reduced intensity.

As shown in FIG. 2b of the drawing, wherein the external end portion 28 of the fiber is bent or deflected from its surface-contacting state externally of the surface which it is mounted, due to flow separation or similar fiber tufts deflecting conditions, the light 24 which leaves the fiber at a reduced intensity at the input end 26 at which the light 24 enters the fiber initially, causes the bending of the fiber tuft 12 at portion 28 to loose some light energy, resulting in a lower intensity when exiting input end 26, thereby providing indication as to the presence of an aerodynamic flow separation phenomenon encountered at that particular location the fiber optic tuft 12. This information may be transmitted as suitable data to a memory and/or processor (not shown) indicative of flow and/or strain conditions which are evident at that location on the surface at which the fiber optic tuft 12 is attached.

As represented in FIGS. 3a and 3b, wherein FIG. 3a illustrates a straight optical fiber tuft 12 which has not been bent or deflected due to flow conditions, wherein the light 24 enters the fiber tuft 12 at the input end 26 opposite to the partially reflective fiber end 20. This enables the light 24a leaving the fiber and the light 24 entering at end 26 to be compared, and the phase angle relative to each other to be measured.

As the optical fiber tuft 12 is bent as shown in FIG. 3b responsive to aerodynamic flow separation, the bent end portion 28 of the fiber tuft 12 causes a change in the relative length of the paths between the entering and exiting lights 24, 24a, as illustrated by the arrows.

Thus, the light 24a leaves the fiber tuft end 26 at a different phase angle relative to the source light 24, inasmuch as the effective path length of the light has been changed responsive to the bending of the optical fiber tuft 12. Thus, the obtained phase angle is an indicator of the amount of strain, (or stress) being encountered by the structure mounting the tuft 12.

Figure 4:
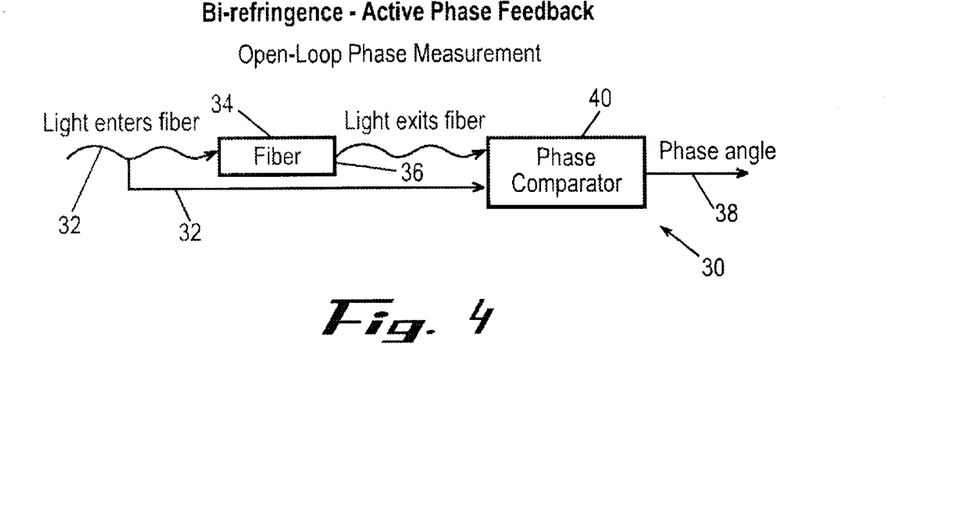
FIG. 4 illustrates birefringence of an optical fiber tuft in an active phase feedback utilizing open-loop phase measurement of the fiber of FIG. 3a and 3b.

As shown in FIG. 4 of the drawing, there is represented a birefringence-active phase feedback system 30, wherein there is implemented an open-loop phase measurement of the phase angle. In essence, the source light 32 enters the optic fiber tuft 34 at one end and exits at the opposite end 36, this end 36 being bendable in response to flow separation. A phase comparator 40, which also receives source light 32, measures the differential between the entering and exiting fiber light 32 so as to determine the phase angle 38.

Figure 5:
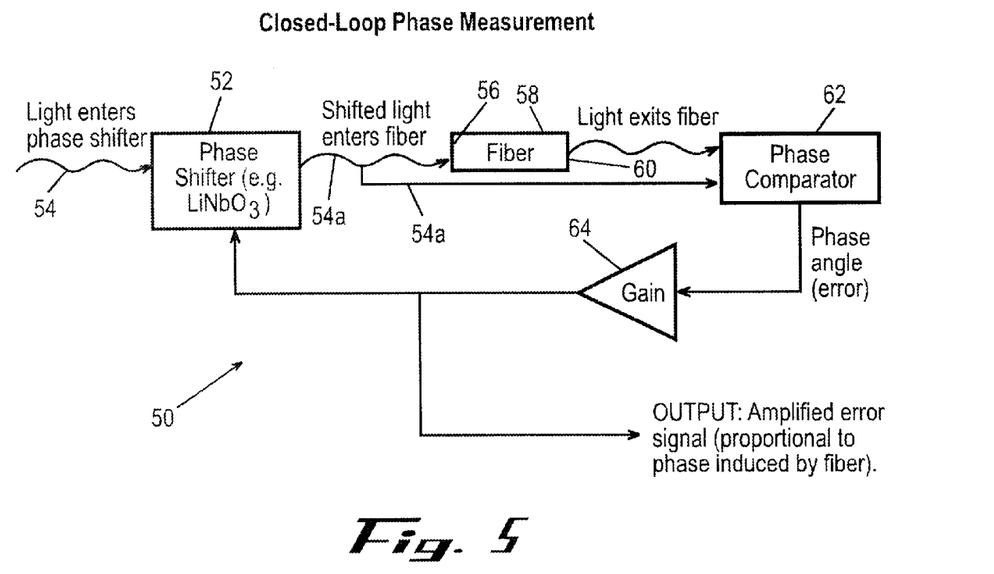
FIG. 5 illustrates the active phase feedback of the optical fiber tuft in a closed loop phase measurement arrangement.

Alternatively, in a closed loop-phase measurement system 50, as illustrated in FIG. 5 of the drawings, a phase shifter 52 has source light 54 entering therein, and the shifted light 54a, upon exit from phase shifter 52, enters an inlet end 56 of the optic fiber tuft 58 with the light exiting the other bendable end 60 of the tuft, which is responsive to flow separation. A phase comparator 62 has the shifted light 54a prior to entering the fiber conveyed thereto and also the light 54a exiting from the optic fiber tufts, with the phase angle error being conducted to a gain amplifier 64, which amplifies the produced error signal at an output proportional to the phase shift induced by the fiber tuft 58, and also feeds the amplified signal back to phase shifter 52. The phase shifter; for example, may comprise a $LiNbO_3$ element, as is known in the technology.

Figure 6:
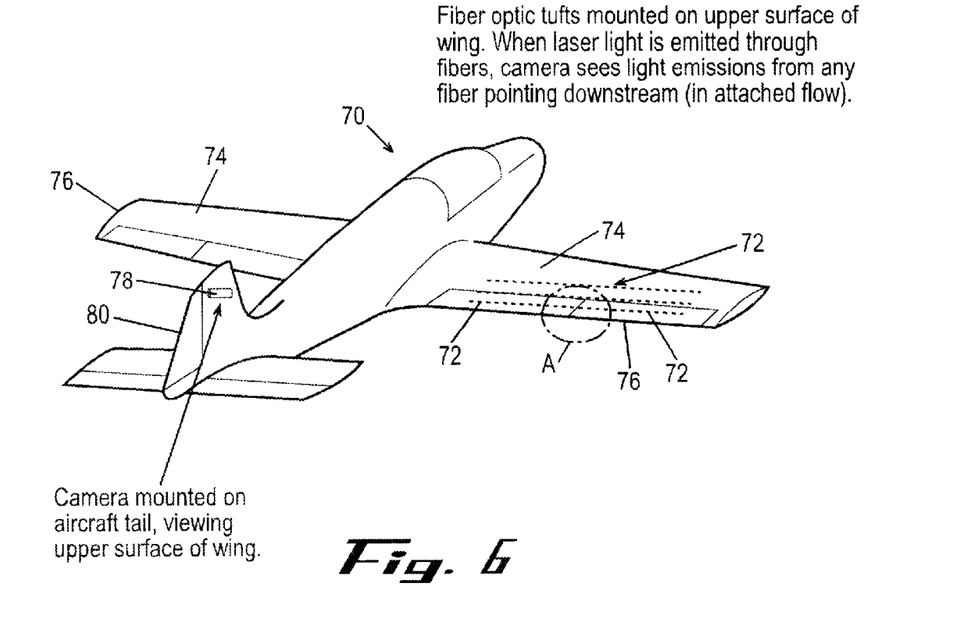
FIG. 6 illustrates a perspective diagrammatic view of an aircraft providing for optical transmission to a camera derived by information from a fiber optic tuft mounted on an upper surface of a wing.
Figure 7A:
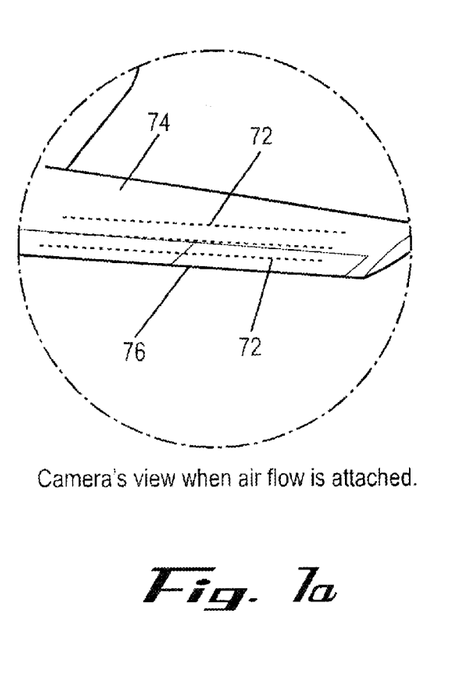
FIG. 7a illustrates an enlarged detail view of the encircled portion of FIG. 6, with all of the aerodynamic flow being attached.
Figure 7B:
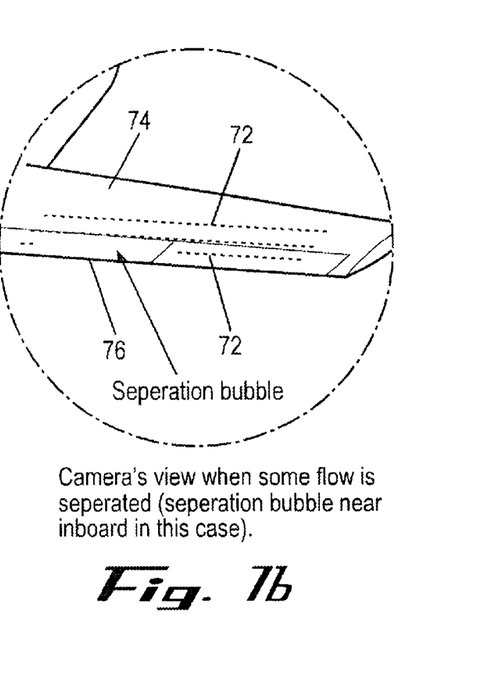
FIG. 7b illustrates a representation similar to FIG. 7a, upon some of the aerodynamic flow being separated.

Reverting to FIGS. 6, 7a and 7b of the drawings, providing for optical transmission in an aircraft 70 a plurality of fiber optic tufts 72 are mounted on an upper surface 74 of a wing 76, or both wings of the aircraft as required. A camera 78 is mounted on the aircraft tail 80, and is oriented to view the upper surface 74 of the wing 76. Thus, when laser light is emitted through the fiber optic tufts 72, the camera sees light emissions from any fiber pointing downstream in the attached wing surface-contacting flow of the fibers.

As illustrated in the enlarged detail FIG. 7a of the drawings, showing the camera's view of the encircled portion A of the wing 76, this illustrates the condition when all of the aerodynamic flow represents the attached optical fibers i.e. their free ends resting on the wing surface. When some of the flow is separated from the wing surface, as shown in FIG. 7b of the drawings, there is formed a separation bubble; in this instance, near the inboard wing surface, and the information is transmitted to the camera 78 representing a measurement which is responsive or proportional to the various strain and flow separation conditions encountered by the respective optic fiber tufts 72 at various locations about the wing surface.

Figure 8:
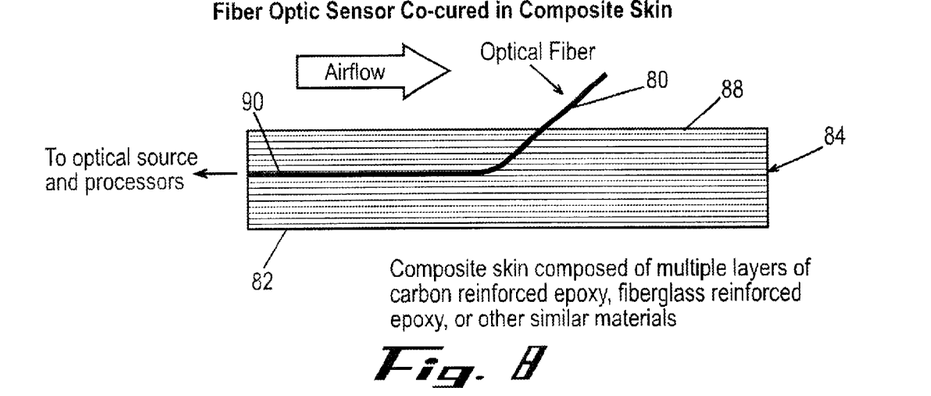
FIG. 8 illustrates, on an enlarged scale, a sectional fragment of a composite skin, such as that of an aircraft wing, wherein the fiber optic sensor is extended and laminated therein.

Turning to FIG. 8 of the drawings, there is illustrated an optical fiber tuft 80 which is co-cured in the laminate composite skin material 82 of an aircraft 84. The composite may be constituted of multiple layers of carbon-reinforced epoxy, fiberglass-reinforced epoxy or other similar materials. The freely moveable or flexible portion of the optical fiber tuft 80 which extends from and is on the skin surface 88 may be positioned so as to rest thereon when no airflow separation encountered. The fiber tuft portion 90 extending within the skin 82 may be conducted to an optical light source and suitable processors (not shown) so as to provide process information derived during the operation of the arrangement.

Figure 9:
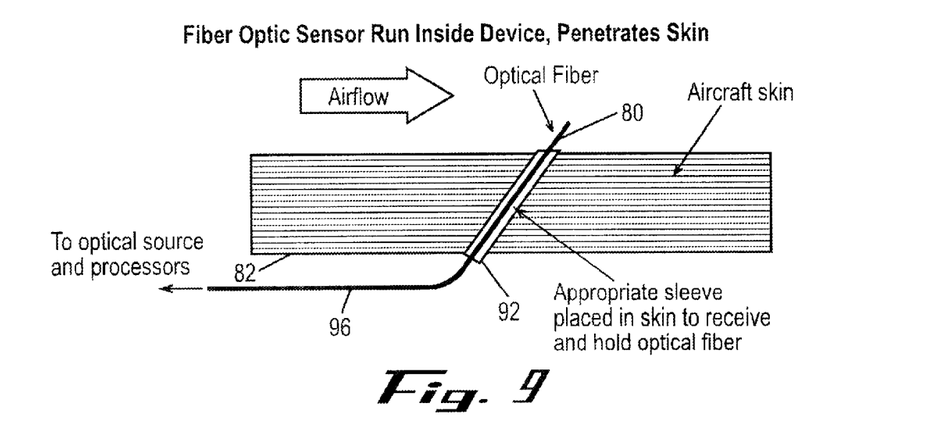
FIG. 9 illustrates the optical fiber being positioned to pass through the skin so as to extend within a device or structure.

As illustrated in the embodiment of FIG. 9, in which the laminated components of the aircraft skin 82 have the fiber optic element or tuft 80 extending therethrough to the interior of the structure, a holder sleeve 92 is formed to extend through the skin thickness, and, positioned to receive and hold the optical fiber 80 passing through the skin in position. In this instance the interior portion 96 of the optical fiber tuft 80 is conducted into the device, and extends to an optical light source and suitable processors (not shown).

Figure 10:
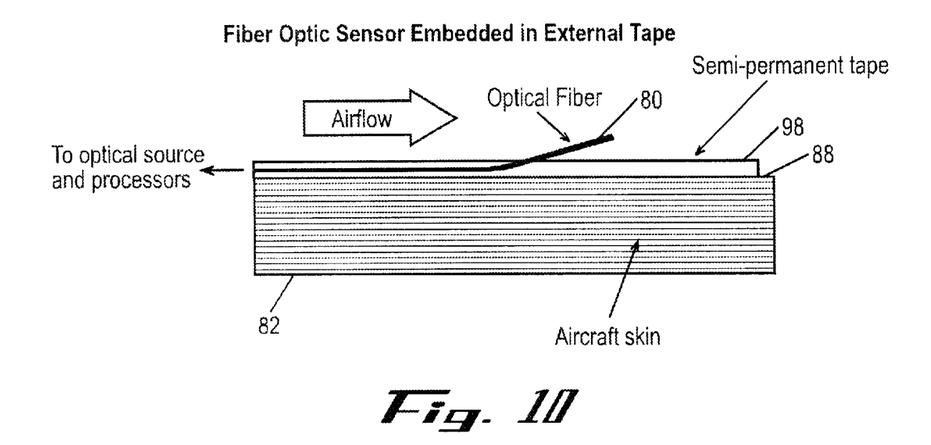
FIG. 10 illustrates the fiber optic sensor embedded in an external tape mounted on the surface of the aircraft skin.

As shown in FIG. 10 of the drawings, in that instance the optical sensor comprises a fiber optic tuft 80 which is embedded in an external tape 98 which is semi-permanently fastened or glued to the aircraft skin surface 88, and extends within the tape to the optical source and suitable processors.

Figure 11:
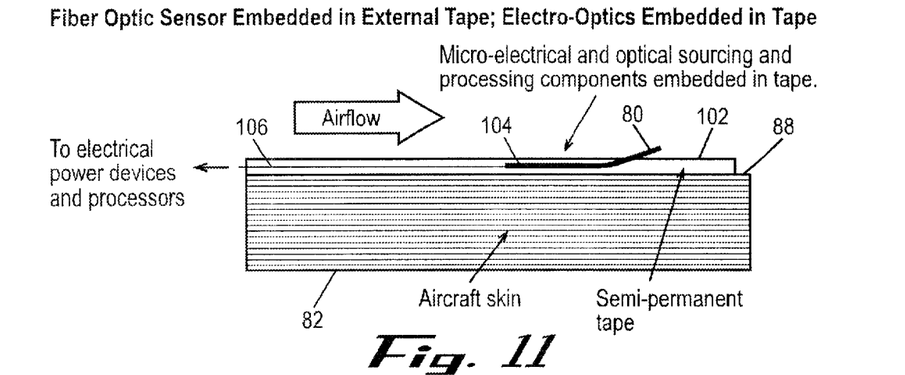
FIG. 11 illustrates the fiber optic sensor embedded in external tape, and with further electro-optics being embedded in the tape.

In the embodiment of FIG. 11, the fiber optic sensor formed by the optical fiber tuft 80 is embedded in an external tape 102, similar to that of the embodiment of FIG. 10, and which also has an electro-optics device 104 embedded in the tape. This device has micro-electrical and optical sourcing and processing components embedded in the tape, and which communicate through suitable conductors 106 to electrical power devices and processors (not shown).

Figure 12:
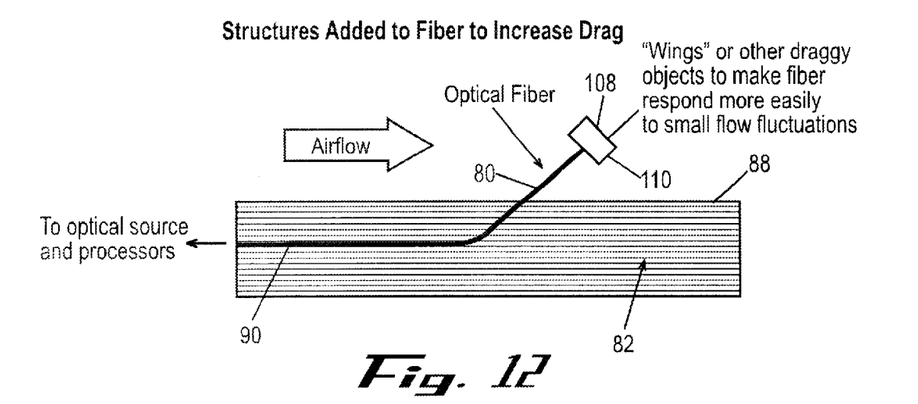
FIG. 12 illustrates the fiber optic sensor of FIG. 8 with the further incorporation of a drag structure so as to render the fiber responsive to small aerodynamic flow fluctuations.

As illustrated in FIG. 12 of the drawings, wherein the optical fiber tuft 80 as in FIG. 8 extends within the aircraft skin 82, the external or flexible end portion 108 of the optical fiber tuft 80 supported on the surface 88 of the skin structure, may have "wings" 110 or other draggy objects fastened thereto in order to render the fiber tuft portion more responsive to relatively small flow fluctuations caused by the airflow.

Although illustrated as wings, these added structures attached to the outer or free flexible optical fiber tuft end 108 may be simply blobs or flat plates. They may also be oriented in different ways to increase sensitivity to different flow directions, and might even consist of something as simple as two layers of tape so as to convert the cylindrical optical fiber into somewhat more of a thin rectangular plate or flap. This additional structure, when attached to the free end 108 of the fiber optic element or tuft 80, also increases the inertia of the fiber which tends to smooth out its response; in effect, decreases its sensitivity to high-frequency fluctuations while maintaining its sensitivity to large, low-frequency fluctuations. This will improve the quality and precision of measurements obtained by the arrangement.

Figure 13:
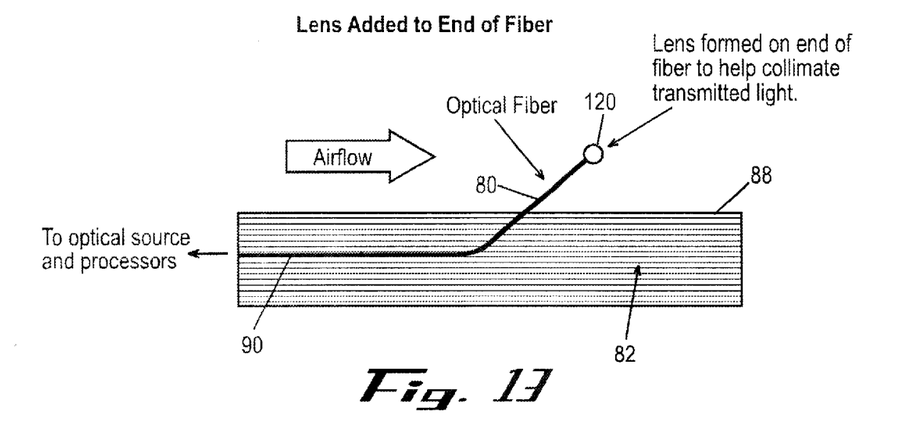
FIG. 13 illustrates diagrammatically a light collimating lens having been added to the fiber optic tuft.

As illustrated in FIG. 13 of the drawings, which is similar to FIG. 8, the fiber optic element or tuft 80 may have a lens 120 formed at the free end 108 of the tuft to help collimate light which is;transmitted therethrough to the optical source and optical processors.

Figure 14:
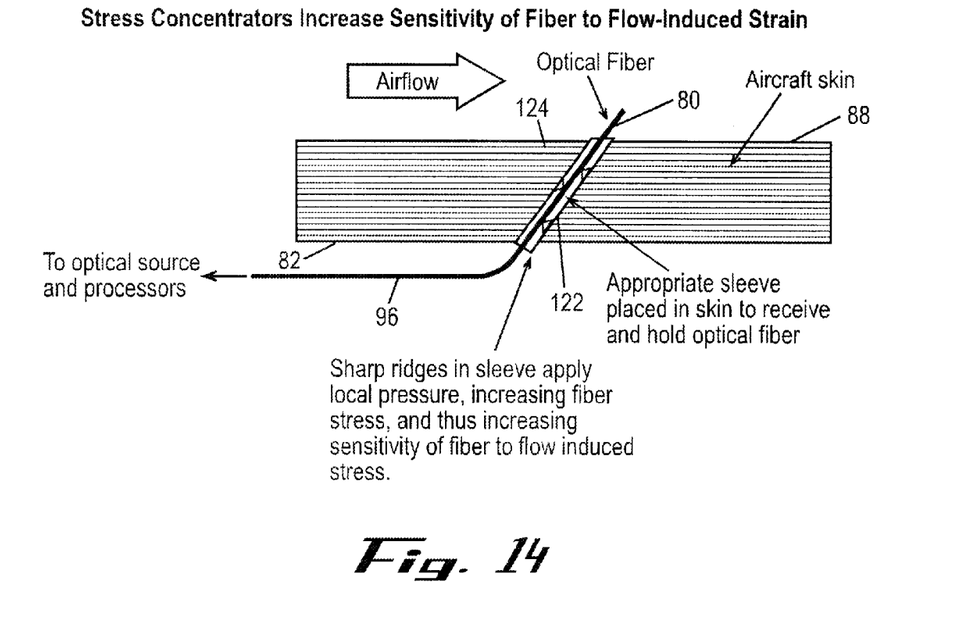
FIG. 14 illustrates stress concentrators mounted to extend about the fiber optic tuft within the skin structure so as to increase the sensitivity of the fiber tuft to flow-induced strain.

Finally, as illustrated in FIG. 14 of the drawings which is similar to FIG. 9, when the optic fiber tuft 80 is positioned so as to extend through the skin to the internal regions of the structure, the sleeve 122 for holding the fiber optic within the aircraft skin or structure may have sharp ridges or crimps 124 formed therein, which apply local pressure to the fiber surface, thereby increasing fiber stress and thereby also increasing the sensitivity of the optical fiber to flow induced stress. This, in essence, may provide more accurate measurements in the strain and stress utilization of these optical fibers.

From the foregoing, although describing the invention in connection with an aircraft skin, it is, clearly obvious that the optical fiber tufts may be utilized in numerous and varied types of devices which are subjected to aerodynamic flow conditions, and resulting strains and stresses during operation.

Although the foregoing optical thermal tuft structures and fiber-optic sensor arrangements have been described in conjunction with the use thereof-for the control of aerodynamic flow separation and detection of strain conditions, particularly for the wings of an aircraft, and intended as feedback.sensor for active flow control on aircraft, the invention is readily applicable to flow sensing in any fluidic device, including gas turbines and aircraft engines, as long as the optical fiber and any other exposed components are designed to be able to withstand the operating low temperatures. Concerning control of aerodynamic flow separation, this may entail the installation of suitable control actuators distributed over the surface areas of the wing or aircraft which are operatively connected with the optical sensors. These actuators, in turn, may be connected to control devices, such as wing flaps, ailerons, flow jets, bumps and other retractable devices which are adapted to modify the flow conditions. Accordingly, this system of sensing and detecting flow separation, enables the sensors to generate signals and transmit them to the actuators so as to initiate corrective procedures in controlling the aerodynamic flow.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An arrangement for the detection of aerodynamic flow separation of a fluidic flow passing over a surface by measurement of the effects of birefringence of optical fibers; said arrangement comprising:
   (a) a plurality of spaced optical fibers communicating with said surface, said optical fibers each having a flexible portion of length normally extending from said surface; said flexible optical fiber portion being displaceable responsive to aerodynamic fluid flows indicative of flow separation and strain in said surface;
   (b) means for measuring differentials in light conducted into an end of said optical fibers distal from said flexible portion and said light exiting from said end responsive to the light reflected at the flexible portion and at the surface, whereby changes in the birefringence of light rays within said optical fibers imparts data indicative of respectively the absence or the presence of flow separation or strain on said surface.

2. An arrangement as claimed in claim 1, wherein upon said flexible optical fiber portion remaining straight with the remaining fiber length, said measured difference between the light intensity conducted into said optical fibers at said one end and the light intensity exiting at said one end being essentially zero and signifying the absence of flow separation.

3. An arrangement as claimed in claim 1, wherein upon said flexible optical fiber portion being bent relative to the remaining length of fiber indicative of fluidic flow separation, said measured difference between the light intensity conducted into said optical fibers at said one end and the light intensity exiting at said one end deviates from zero to a value indicative of the extent of flow separation at said surface.

4. An arrangement as claimed in claim 3, wherein said light exiting at said one end of the optical fibers is at a lower intensity than the light conducted into the optical fibers at said one end.

5. An arrangement as claimed in claim 3, wherein the bending of the flexible optical fiber portion causes a birefringence of light rays within said optical fibers detected as a change in the intensity of the light conducted into said fibers.

6. An arrangement as claimed in claim 1, wherein the displacement of said flexible optical fiber portion causes a birefringence of light rays within said optical fibers to be detected as a change in the phase of the light conducted into said fibers.

7. An arrangement as claimed in claim 1, wherein said surface is formed by the skin of an aircraft wing, said optical fibers extending within said skin essentially in parallel with said surface, said flexible fiber portion extending outwardly from said surface.

8. An arrangement as claimed in claim 1, wherein said surface is formed by the skin of an aircraft wing, said optical fibers extending through said skin into the interior of said wing, said flexible fiber portion extending outwardly from said surface.

9. An arrangement as claimed in claim 8, wherein the optical fiber length extending within said skin is jacketed in a holding sleeve.

10. An arrangement as claimed in claim 9, wherein fiber stress concentration-generating detents are formed on said sleeve so as to increase the sensitivity of the optical fibers to flow-induced stress for measuring strain in said skin.

11. An arrangement as claimed in claim 1, wherein said flexible optical fiber portion is bendable through an angle of about 90° to 180° relative to the remaining fiber length.

12. An arrangement as claimed in claim 11, wherein the exposed length of said flexible optical fiber portion on said surface is about 0.1 to 1.0 inches.

13. An arrangement as claimed in claim 11, wherein the diameter of each said optical fiber is about 0.001 to 0.01 inches.

14. An arrangement as claimed in claim 1, wherein the exposed end of the flexible fiber portion is equipped with draggy objects to render the optical fibers responsive to small flow fluctuations.

15. An arrangement as claimed in claim 14, wherein said draggy objects are selected from weight structures which comprise at least one of wings, plates, tapes or flaps fastened to the free ends of the flexible fiber portions.

16. An arrangement as claimed in claim 6, wherein a phase measurement of the change in phase comprises an open-loop birefringence active phase feedback defining a phase angle to impart data to processing means.

17. An arrangement as claimed in claim 6, wherein a phase measurement of the change in phase comprises a closed-loop birefringence active phase feedback generating an error signal proportional to phase values induced by fiber movements.

18. An arrangement as, claimed in claim 1, wherein a lens is formed on the exposed end of the flexible fiber portion so as to collimate light being conducted through the optical fibers.

19. An arrangement as claimed in claim 1, wherein said measurements concurrently measure flow separation and strain produced on said surface responsive to birefringence measured in said optical fibers.

20. An arrangement for the detection of aerodynamic flow separation of a fluidic flow passing over a surface by measurement of the effects of transmission of light emitted from optical fibers; said arrangement comprising:
   (a) a plurality of spaced optical fibers communicating with said surface, said optical fibers each having a flexible portion of length normally extending from said surface; said flexible optical fiber portion being displaceable responsive to aerodynamic fluid flows indicative of flow separation and strain in said surface;
   (b) means for measuring differentials in the intensity of light emitted by said optical fibers from said flexible portion, whereby changes in the intensity of light emitted from said optical fibers imparts data indicative of respectively the absence or the presence of flow separation or strain on said surface.

21. An arrangement as claimed in claim 20, wherein said measurements are obtained by a camera mounted on an aircraft, said camera being on the light-emitting ends of said flexible optical fiber portions.

22. A method for the detection of aerodynamic flow separation of a fluidic flow passing over a surface by measurement of the effects of birefringence of optical fibers; said method comprising:
   (a) a plurality of spaced optical fibers communicating with said surface, said optical fibers each having a flexible portion of length normally extending from said surface, said flexible optical fiber portion being displaceable responsive to aerodynamic fluid flows indicative of flow separation and strain on said surface;
   (b) measuring differentials in light conducted into an end of said optical fibers distal from said flexible portion and said light exiting from said end responsive to the light reflected at the flexible portion and at the surface, whereby changes in the birefringence of light rays within said optical fibers imparts data indicative of respectively the absence or the presence of flow separation or strain on said surface.

23. A method as claimed in claim 22, wherein upon said flexible optical fiber portion remaining straight with the remaining fiber length, said measured difference between the light intensity conducted into said optical fibers at said one end and the light intensity exiting at said one end being essentially zero and signifying the absence of flow separation.

24. A method as claimed in claim 22, wherein upon said flexible optical fiber portion being bent relative to the remaining length of fiber indicative of fluidic flow separation, said measured difference between the light intensity conducted into said optical fibers at said one end and the light intensity exiting at said one end deviates from zero to a value indicative of the extent of flow separation at said surface.

25. A method as claimed in claim 24, wherein said light exiting at said one end of the optical fibers is at a lower intensity than the light conducted into the optical fibers at said end.

26. A method as claimed in claim 24, wherein the bending of the flexible optical fiber portion causes a birefringence in said optical fibers detected as a change in the intensity of the light conducted into said fibers.

27. A method as claimed in claim 22, wherein the displacement of said flexible optical fiber portion cause a birefringence of light rays within said optical fibers to be detected as a change in the phase of the light conducted into said fibers.

28. A method as claimed in claim 22, wherein said surface is formed by the skin of an aircraft wing, said optical fibers extending within said skin essentially in parallel with said surface, said flexible fiber portion extending outwardly from said surface.

29. A method as claimed in claim 22, wherein said surface is formed by the skin of an aircraft wing, said optical fibers extending through said skin into the interior of said wing, said flexible fiber portion extending outwardly from said surface.

30. A method as claimed in claim 29, wherein the optical fiber length extending within said skin is jacketed in a holding sleeve.

31. A method as claimed in claim 30, wherein fiber stress concentration-generating detents are formed on said sleeve so as to increase the sensitivity of the optical fibers to flow-induced stress for measuring strain in said skin.

32. A method as claimed in claim 22, wherein said flexible optical fiber portion is bendable through an angle of up to about 90° relative to the remaining fiber length.

33. A method as claimed in claim 32, wherein the exposed length of said flexible optical fiber portion on said surface is about 0.1 to 1.0 inches.

34. A method as claimed in claim 32, wherein the diameter of each said optical fiber is about 0.001 to 0.01 inches.

35. A method as claimed in claim 22, wherein exposed end of the flexible fiber portion is equipped with draggy objects to render the optical fibers responsive to small flow fluctuations.

36. A method as claimed in claim 35, wherein said draggy objects are selected from weight structures which comprise at least one of wings, plates, tapes or flaps fastened to the free ends of the flexible fiber portions.

37. A method as claimed in claim 27, further comprising measuring the change in phase with an open-loop birefringence active phase feedback defining a phase angle to impart data to processing means.

38. A method as claimed in claim 27, further comprising measuring the change in phase with a closed-loop birefringence active phase feedback generating an error signal proportional to phase values induced by fiber movements.

39. A method as claimed in claim 22, wherein a lens is formed on the exposed end of the flexible fiber portion so as to collimate light being conducted through the optical fibers.

40. A method as claimed in claim 22, wherein said measurements concurrently measure flow separation and strain produced on said surface responsive to birefringence measured in said optical fibers.

41. A method for the detection of aerodynamic flow separation of a fluidic flow passing over a surface by measurement of the effects of transmission of light emitted from optical fibers; said method of comprising:
   (a) a plurality of spaced optical fibers communicating with said surface, said optical fibers each having a flexible portion of length normally extending from said surface, said flexible optical fiber portion being displaceable responsive to aerodynamic fluid flows indicative of flow separation and strain on said surface;
   (b) measuring differentials in the intensity of light emitted from said flexible portion, whereby changes in the intensity of light emitted from light rays within said optical fibers imparts data indicative of respectively the absence or the presence of flow separation or strain on said surface.

42. A method as claimed in claim 41, wherein said measurements are obtained by a-camera mounted on an aircraft, said camera being focused on the light-emitting ends of said flexible optical fiber portions.

* * * * *